United States Patent Office 3,346,624
Patented Oct. 10, 1967

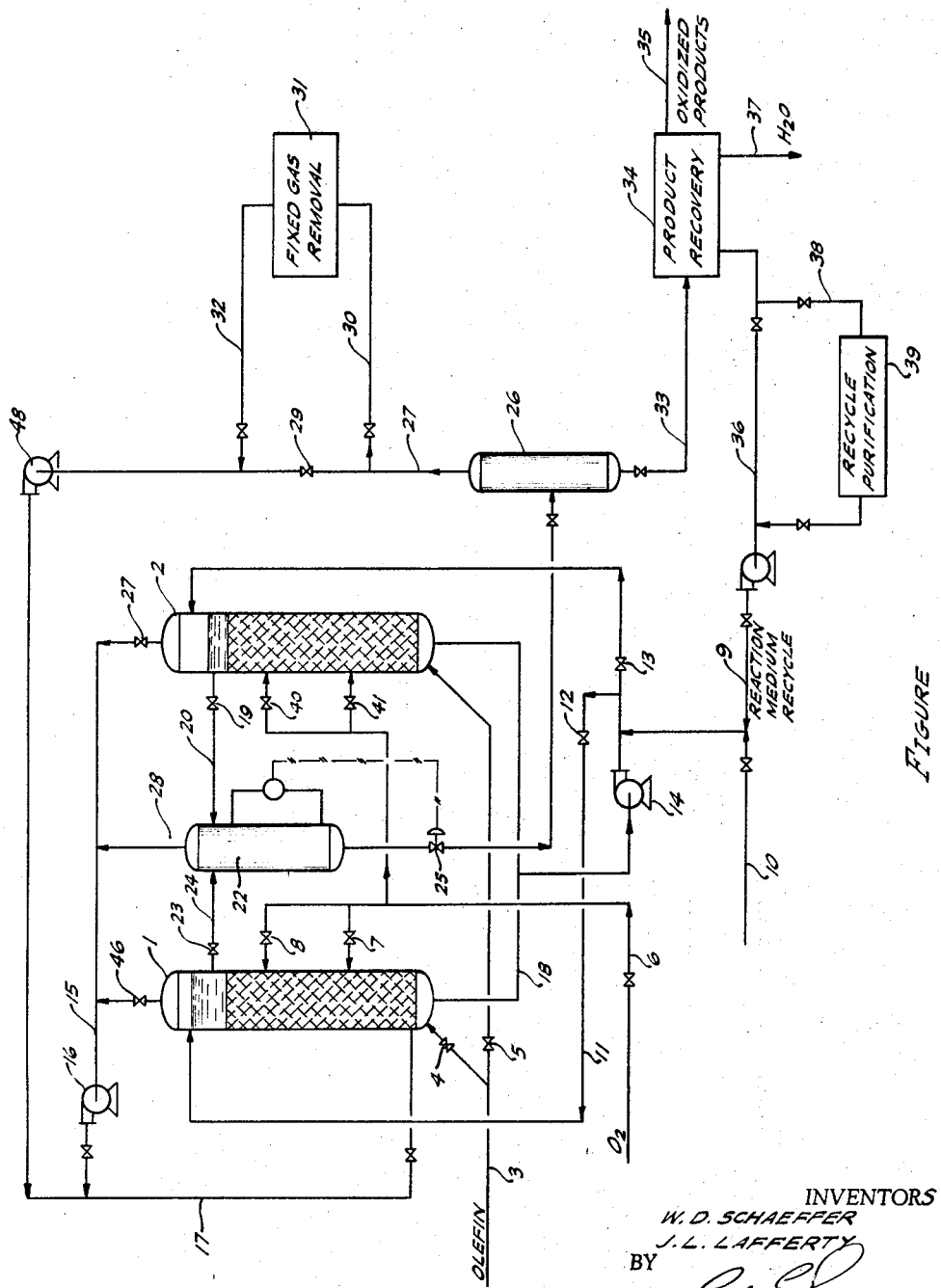

3,346,624
PROCESS FOR THE CATALYTIC OXIDATION OF OLEFINS WITH A GROUP VIII NOBLE METAL CATALYST AND OXYGEN TO ALDEHYDES, ACETALS AND UNSATURATED ESTERS
William D. Schaeffer, Pomona, and James L. Lafferty, Yorba Linda, Calif., assignors to Union Oil Company of California, Los Angeles, Calif., a corporation of California
Filed May 11, 1964, Ser. No. 366,556
9 Claims. (Cl. 260—497)

This invention relates to the oxidation of olefins to valuable oxygenated compounds and in particular relates to the oxidation of olefins to acetals, ketals, aldehydes and carboxylic acid esters of unsaturated alcohols.

In a particular embodiment, this invention relates to the oxidation of ethylene to vinyl carboxylates and acetaldehyde by contacting ethylene with oxygen and a reaction medium comprising a carboxylic acid in the presence of a platinum group metal.

In a second embodiment, the invention relates to the oxidation of ethylene to acetals and acetaldehyde by contacting ethylene and oxygen with a reaction medium comprising an alcohol in the presence of catalytic amounts of a platinum group metal. Other embodiments of the invention will be apparent from the following description.

The aforementioned oxidation involves the simultaneous reduction of the dissolved platinum group metal to the free metal and reoxidation of the metal. To facilitate oxidation of the reduced metal, various redox salts can be employed such as copper and iron halides which also fluctuate between high and low oxidation states during the reaction. The redox metal is restored to its high oxidation state by contact of the reduced redox agent with an oxygen containing gas.

Platinum group metals useful in this oxidation include the platinum subgroup, i.e., platinum, osmium and iridium and the palladium subgroup, i.e., ruthenium, rhodium and palladium. Palladium is preferred for its greater activity. The redox agent can be any multivalent metal having an oxidation potential more positive than the platinum group metal in the liquid reaction medium. Copper is preferred for its greater activity, although any of the redox agents hereinafter specified can be used.

Because a substantial portion of the platinum group metal is present in its reduced state as a precipitate, e.g., the free metal, in the reaction zone, considerable difficulty is experienced in recovering the oxidized products from the reaction zone. Generally all or a portion of the reactants must be withdrawn from the reaction zone as a liquid phase and distilled to recover the desired products such as the acetals or unsaturated esters. The solution withdrawn as a crude product from the reactor will normally contain a substantial portion of the platinum group metal as a suspended precipitate together with some insoluble salts of the low oxidation state of the redox metal. The subsequent distillation of this material is troublesome because the precipitates accumulate in the distillation tower and other processing equipment.

Particularly irksome in the distillation is the formation of a very tenacious deposit or film of the platinum group metal on the surfaces of the distillation zone. While the adherence of this film to the equipment can be reduced somewhat by the use of titanium equipment and linings, the precipitates in the crude reaction product can cause difficulties by clogging transfer lines, heat exchange surfaces, etc. The problem can be completely eliminated by filtering the crude oxidation product to remove these precipitates prior to distilaltion since considerable amounts of the platinum group metal are dissolved in the product and precipitate only upon subsequent handling or distillation.

It is an object of this invention to provide an efficient method for the oxidation of olefins to valuable oxidized products.

It is also an object of this invention to provide a method for the aforesaid oxidation wherein the problems heretofore encountered in handling and distilling the crude oxidate are obviated.

It is a further object of this invention to provide a method for the platinum group metal catalyzed oxidation of olefins by contact of said olefin with oxygen and a liquid reaction medium wherein the liquid oxidate withdrawn from said oxidation is free of said platinum group metal.

It is also a further object of this invention to provide a method for the oxidation of the olefins with platinum group metals wherein the platinum group metal is maintained on a solid substrate during the oxidation.

Other and related objects of this invention will be apparent from the following description.

We have now found that the aforementioned objectives can be achieved in a process comprising the steps of introducing the olefin, oxygen and a liquid reaction medium comprising the carboxylic acid or alcohol reactant into mutual contact in a first reaction zone packed with a finely divided solid which is inert to the oxidation and insoluble in the reaction medium; withdrawing a liquid phase oxidate from said first reaction zone and introducing the liquid oxidate into a second reaction zone that is also packed with said inert solid; and passing said oxidate through said second reaction zone while maintaining said second reaction zone substantially free of oxygen. The crude reaction product withdrawn from the second reaction zone is free of any dissolved or entrained quantities of the platinum group metal. This crude reaction product can be subsequently distilled to recover the desired product, i.e., unsaturated ester or acetal from the reaction medium which is returned to the reaction zone for further contacting. Various contacting techniques can be used, e.g., countercurrent flow of the gas to the liquid which can be trickled down over the packed solids in the reactor. The reaction zones can also be flooded with the solid immersed beneath a liquid level and concurrent or countercurrent gas contacting of the liquid can be used.

During passage of the crude oxidate through the second reaction zone the dissolved quantities of the platinum group metal present in this crude oxidate are reduced to the free metal or other insoluble complex. We have found that when this reduction is performed in the presence of a finely divided substrate, preferably silica, the platinum group metal precipitate forms entirely on the solid substrate and is effectively removed from the liquid phase. In this manner the platinum group metal is retained within the reaction zone and subsequent distillation equipment remains free of precipitates and mirrors.

During the oxidation the platinum group metal will migrate from the first to the second reaction zone since the crude oxidate removed from the first reaction zone contains substantial quantities of the platinum group metal as a dissolved salt. When the crude oxidate, however, is introduced into the second reaction zone where it is maintained out of contact with oxygen, the dissolved quantities of ethylene in this crude oxidate are sufficient to reduce the platinum group metal to the insoluble precipitate on the inert solid in the second reaction zone. In a preferred embodiment, the reduction is facilitated by sweeping the second reaction zone with a reducing gas such as carbon monoxide or a low molecular weight olefin which is introduced into this zone, preferably in countercurrent flow to the crude oxidate. Preferably, the olefin introduced into the second reactor is the same as that used as the reactant in the first reactor to permit combining of the gas effluents from these reactors and recycling of the combined effluents to the reaction.

Because the platinum group metal migrates from the first to the second reaction zone, the rate of oxidation in the first reaction zone will gradually decline. When a substantial portion of the platinum group metal has migrated from the first zone, the oxidation rate declines in the first zone to a level which is prohibitively slow, e.g., the oxygen absorption substantially ceases or decreases to only from about 10 to 75 percent of the absorption rate initially observed. At this time, the introduction of the reactants is reversed between the first and the second reaction zones. Thus in accordance with our invention, when the oxidation rate has declined below a determined level, the introduction of ethylene and oxygen is switched from the first to the second reaction zone and the crude oxidate is withdrawn from the second and introduced into the first reaction zone. The first reaction zone is now maintained substantially free of oxygen so that the reduction of the platinum group metal is completed in passage of the crude oxidate therethrough. In this fashion we have found that the oxidation of the olefin to unsaturated esters or acetals can be maintained at a desirable high rate for extended reaction periods. Additionally, the crude reaction product is substantially free of any dissolved or entrained platinum group metal and hence its subsequent distillation and handling is free of the aforementioned precipitation and mirroring problems.

Various finely divided solids can be used in the reaction zones so long as they are insoluble in the reaction medium and inert to the oxidation under the conditions in the reaction zone. Examples of suitable solids are silicas such as silica gel, diatomaceous earth, quartz, etc.; silicon carbides, e.g., Carborundum; titania; zirconia; charcoal; etc. Of these, silica and particularly silica gel is preferred. Preferably the finely-divided solid has a high specific surface to provide a large area for deposition of the platinum metal. Solids having a specific surface from about 2 to about 1000 square meters per gram are preferred and most preferred are those having from about 300 to about 850 square meters per gram. The solid particles should be sufficiently large that they are not entrained in the liquid phase withdrawal from the reactors. Particles having sizes from about 10 mesh (0.065 inch) to 3 mesh (0.263 inch) can be used and sizes ranging from about 10 mesh to about 6 mesh are preferred.

The process of our invention will now be described by reference to the figure.

As illustrated in the figure, the preferred system comprises a first reactor 1 and a second reactor 2 which are manifolded with olefin, oxygen and reaction medium introduction lines. The reaction medium withdrawal lines from these reactors are manifolded to permit reversing the flow of the liquid phase reactants through these reactors. As illustrated, the desired quantity of fresh and recycled olefin is introduced through line 3 into reactor 1 with valve 4 open and valve 5 closed. In a preferred embodiment, valve 5 is opened slightly to permit a flow of olefin into the second reactor to maintain this reactor free of oxygen and under reducing conditions. An oxygen containing gas is admitted through line 6 into reactor 1 with valves 7 and 8 opened to the desired extent to control the introduction of oxygen into this reaction zone. Although two points of oxygen introduction are shown, it is understood of course that more points of introduction of the oxygen containing gas can be employed to obtain thorough distribution of the oxygen through the reaction zone.

The rate of oxygen addition to the reaction zone can be controlled by measuring the oxygen content of the exit or recycle gases in line 17 and limiting the oxygen introduction to maintain the oxygen content of these gases between about 0 and 5 volume percent; preferably between about 0.5 and 2 volume percent.

The reaction medium is supplied to the reaction zone through line 11, the majority of the reaction medium being supplied through line 9 with additional quantities of makeup and replenishment reaction medium supplied through line 10. This reaction medium is introduced into reactor 1 through line 11 with valve 12 open and valve 13 closed. Additionally, a large quantity of internal recycle of the reaction medium can be circulated through line 11 by pump 14 which withdraws a liquid phase from reaction zone 1. The extent of this recycle can be controlled so as to maintain the desired temperature profile throughout the reaction zone 1, the greater amounts of recycle tending to equalize the reaction temperature throughout this reaction zone. Generally, liquid phase recycle to liquid withdrawal ratios from 1:1 to about 100:1 can be used; from about 3:1 to 10:1 are preferred. The ethylene is supplied in excess to reaction zone 1 and is removed therefrom through gas vent line 15 with valve 16 open. This olefin is recycled by blower 16 through line 17 for re-introduction into the reaction zone. In a preferred embodiment, a ratio of recirculated gas to fresh oxygen from about 1:1 to 100:1 can be used to prevent any localized overconcentration of oxygen in the reaction zone.

Crude oxidate is withdrawn from reaction zone 1 through line 18 and passed into the bottom of reaction zone 2. Valve 19 in line 20 is opened to permit the crude reaction product of reaction zone 2 to pass into level control drum 22. Valve 23 in line 24 is closed and the level control in drum 22 is maintained sufficiently low that the liquid head of the reactants in reaction zone 1 forces the crude oxidate through line 18 and into reaction zone 2. The level control on drum 22 can automatically set valve 25 to permit passage of the crude reaction product into product receiver 26. The valves in the gas lines from reaction zone 2 and drum 22, valves 27 and 28, are opened to equalize the pressure of these zones and permit recycling of the excess olefin through blower 16 and recycle line 17.

Product receiver 26 is maintained at a pressure reduced from that of the reaction zones. This pressure reduction flashes dissolved quantities of the olefin and fixed gases from the reaction medium and these gases are returned to further contacting through line 27 by compressor 28. During the oxidation, a measureable quantity of fixed gases, namely carbon dioxide, are formed, and these gases can be continuously or periodically purged from the system. Accordingly, valve 29 can be wholly or partially closed to direct all or a portion of the flashed gases from line 27 lines 30 to fixed gas removal zone 31. The purified gases are returned to line 27 through line 32. In zone 31, conventional means for removing carbon oxides from gases can be employed such as absorption with absorption media such as solutions of monoethanol amine, potassium carbonate, etc.

The crude reaction product freed from residual and dissolved quantities of gases is removed from the product receiver 26 through line 33 and passed to product recovery zone 34. Suitable product recovery steps can be employed in this zone depending on the nature of the products produced. In synthesis of vinyl acetate by the oxidation of ethylene in an acetic acid reaction medium, these steps can comprise the distillation of all components boiling below acetic acid in a single stage followed by appropriate distillations to separate the products. In another method, the acetaldehyde and lower boiling by-products can be removed first and an azeotropic distillation can be performed in a second step to separate a water-vinyl acetate azeotrope from the reaction medium. The vinyl acetate can be subsequently purified for recovery through line 35 as the major oxidized product. The acetaldehyde by-product also recovered can be marketed as such, but preferably it is oxidized to acetic acid by recycling to the oxidation zone. In this manner the process is made self-sufficient in regard to acetic acid. The water formed during the oxidation is removed through line 37 after recovery of all oxidized products therefrom.

When the oxidation step comprises the synthesis of acetals from olefins, e.g., dimethyl acetal or diethyl acetal from ethylene, product recovery zone 34 comprises a series of distillation steps using azeotropic or conventional fractionation to separate a relatively pure acetal product or mixture of the acetal in alcohol as the product. This product can be marketed as such, or passed to a suitable pyrolysis step for the production of the corresponding vinyl ether.

In either method, the recycle reaction medium, i.e., that containing the carboxylic acid or alkanol, is removed from the product recovery zone through line 36 and recycled to the oxidation zone. Suitable makeup catalyst components are added through line 10 to maintain the desired concentration of catalyst components during the process.

During the oxidation, slight quantities of high boiling by-products accumulate in the reaction medium and, accordingly, it is preferred to withdraw all or a portion of the recycle reaction medium through line 38 and introduce this withdrawn portion into a recycle purification step zone 39 for removal of these high boiling by-products.

A suitable treatment comprises distillation of the withdrawn reaction medium to volatilize from 80 to 95 percent of the medium and condense this fraction for recycling. The bottoms temperature for this distillation is between about 150° to 180° C. The viscous residue is then extracted with a mixture of water and a water immiscible organic solvent which, preferably, has a greater density than water such as the halogenated hydrocarbons, e.g., chloroform, methylene chloride, methylene bromides, trichloroethane, dichloropentane, etc. Volumetric ratios of solvent to water from about 1:9 to 9:1; preferably from 3:7 to 7:3 can be used. The high boiling organic by-products such as ethyl acetate, ethylene glycol diacetate, ethylidene diacetate, acrylic acid, etc., are concentrated in the organic solvent and the catalyst metals, e.g., cupric and alkali metal salts are concentrated in the aqueous phase. Further extraction of the aqueous phase can be practiced with about one to three repeated steps to remove all traces of high boiling organic products prior to recycling of the aqueous phase. The organic phases can be combined and purified, generally by heating, to volatilize the solvent therefrom which is condensed and recovered for reuse in the extraction steps. Preferably, the distillation residue is acidified with the makeup hydrochloridic or hydrobromic acid prior to extraction to insure that all by-product acrylic acid is removed in the organic phase and not in the aqueous phase as cupric or lithium acrylates. This can be insured, e.g., by adding sufficient hydrochloric acid to the residue to provide the stoichiometric amount to form the chloride salts of all metal cations in the residue.

When the reaction rate in reaction zone 1 has declined to an undesirable rate, the introduction of reactants into the reaction zones is reversed by closing valves 7 and 8 to stop the introducion of oxygen into reaction zone 1. The introduction of the olefin is changed from reaction zone 1 to 2 by closing valve 4 and opening valve 5. The recycle line valve 13 is opened and valve 12 closed to supply the internal recycle to the reaction zone 2. Valve 19 is closed and valve 23 is opened to withdraw the crude reaction product from reaction zone 1 and pass this product into the level controller 22. Thereafter, valves 40 and 41 are opened to introduce oxygen into reaction zone 2 for contact with the olefin and reaction medium therein.

The olefin used in the oxidation can be any hydrocarbon olefin having 2 to about 20 carbons, preferably, low molecular weight hydrocarbon olefins having 2 to about 5 carbons such as ethylene, propylene, butene-1, butene-2, isobutene, pentene, isopentene, etc. Preferably, ethylene is the olefin and the oxygenated products are vinyl carboxylates and acetaldehyde or acetals and acetaldehyde, depending on the nature of the reaction medium. The other olefins yield analogous products, e.g., propylene yields propenyl and isopropenyl carboxylates, etc.

The reaction medium employed in the oxidation preferably comprises a substantially anhydrous organic solvent. In general, the water content of the reaction medium should be less than about 10 percent, preferably less than about 5 weight percent and most preferably less than 2 weight percent. During the oxidation of the olefin, water is formed and accumulates in the reaction medium. Accordingly, it is preferred to recycle the reaction medium as a substantially anhydrous liquid, all water being removed in the distillation of the product. It is also preferred to employ relatively high liquid space rates to prevent the accumulation of amounts of water in excess of those previously stated. In general, the presence of the water in the reaction medium favors the oxidation of the olefin to aldehydes or ketones whereas the oxidation in anhydrous or substantially anhydrous organic media favors esters and acetals.

For the oxidation of olefins to acetals, the organic solvent employed is an aliphatic alcohol that is a liquid under the reaction conditions. Aliphatic alcohols having from 1 to about 20 carbon atoms can be employed such as methanol, ethanol, isopropanol, propanol, butanol, isobutanol, pentanol, isopentanol, hexanol, isohexanol, heptanol, isoheptanol, cyclohexanol, octanol, isooctanol, decanol, isodecanol, tridecanol, isododecanol, pentadecanol, isohexadecanol, octadecanol, tricosanol, isotetracosanol, pentacosanol, etc. Preferably, primary or secondary low molecular weight alcohols having from 1 to about 5 carbons are employed as solvents including methanol, ethanol, propanol, isopropanol, butanol, isobutanol, pentanol, isopentanol, etc.

For the preparation of unsaturated esters of carboxylic acids, the reaction medium should comprise a carboxylic acid such as acetic, propionic, butyric, valeric, isovaleric, caprylic, isocaprylic, succinic, glutaric, adipic, pimelic, etc. Preferably, the carboxylic acid employed is the acid of the desired acyloxy radical desired in the unsaturated ester, e.g., acetic acid is used in the preparation of vinyl acetate, propionic acid is employed in the preparation of vinyl propionates, etc.

Various other inert organic solvents can be employed in addition to the reactive alcohol or carboxylic acid aforementioned. Examples of various organic liquids that can also be present in amounts between about 0 and about 90 percent of the reaction medium employed for the synthesis of acetals or the unsaturated esters include formthe desired acyloxy radical desired in the unsaturated amide, dimethylformamide, chlorobenzene, dichlorobenzene, aliphatic hydrocarbons such as hexane, decane, dodecane, etc.; toluene, xylene, pseudocumene, etc.

To maintain a sufficiently high oxidation rate, we prefer to employ a halogen in the reaction medium. The halogen can be added as elemental chlorine or bromine; however, it is preferred to employ less volatile halogen compounds such as hydrogen chloride; hydrogen bromide, alkali metal halides, e.g., sodium chloride, lithium bromide, cesium chloride, potassium bromide, sodium bromate, lithium chlorate; ammonium halides, ammonium bromide, ammonium chloride, or any of the aforementioned platinum metal bromides or chlorides. Various organic compounds which liberate hydrogen halide or halogen under the reaction conditions can be used, such as aliphatic chlorides or bromides, e.g., ethyl bromide, propyl chloride, butyl chloride, benzyl bromide, phosgene, etc. In general, sufficient of the aforementioned halogen containing compounds should be added to provide between about 0.05 and about 5.0 weight percent free or coordinately bonded or covalently bonded halogen in the reaction zone; preferably concentrations between about 0.1 and about 3.0 are employed. While chlorine containing compounds are generally preferred, bromine compounds can be preferred for certain reactions, e.g., in substantially anhydrous acetic acid, bromine compounds tend to favor oxidation of ethylene to vinyl acetate whereas chlorine compounds tend to favor the oxidation of ethylene to acetaldehyde and ultimately, to acetic acid.

As previously mentioned, various redox compounds can, optionally, be used in the reaction medium. In general, any multivalent metal salt having an oxidation potential higher, i.e., more positive, than the platinum metal in the solution can be used. Typical of such are the soluble salts of multivalent metal ions such as the acetates, bromides or chlorides of copper, iron, manganese, cobalt, mercury, nickel, cerium, uranium, bismuth, tantalum, chromium, molybdenum or vanadium. Of these, cupric and ferric salts are preferred and cupric salts are most preferred, particularly in the substantially anhydrous medium where the cupric salts appreciably increase the rate of oxidation. In general, cupric acetate, chloride or bromide is added to the reaction medium to provide a concentration of copper therein between about 0.1 and about 5 weight percent; preferably between about 0.5 and about 3.0 weight percent.

When multivalent metal salts are used as the redox agent, it is preferred to control the concentration of the dissolved halide, previously mentioned, sufficiently high to maintain solubility of the heavy metal salt. In particular, the atomic ratio of dissolved halogen to the dissolved metal should be greater than 6.5:1 and preferably greater than about 7.5:1 to prevent precipitation of the multivalent metal during passage of the crude oxidate through the second or reducing reaction zone.

Slight amounts of oxalic acid are formed as a byproduct of the oxidation of ethylene. Since cupric oxalate is insoluble in the reaction medium, i.e., in alcohols or carboxylic acids, it is desirable to remove the oxalic acid or copper oxalates when using a copper salt as the redox agent. This can be accomplished by continuous replenishment of the copper salt, e.g., cupric chloride, acetate, etc., and removal of the insoluble copper oxalate from the reaction medium. In a preferred embodiment, however, a vanadium compound is incorporated in the reaction medium to provide from 0.01 to about 2 and preferably from 0.05 to about 0.5 weight percent vanadium in the medium. This vanadium salt catalyzes the oxidation of the oxalates or oxalic acid in the oxidation zone and thereby prevents precipitation of the copper. Vanadium compounds that are soluble in the reaction medium can be used; the following are illustrative of the class: vanadium pentoxide, vanadic acid, vanadium tribromide, vanadium dichloride, vanadium trichloride, vanadium tetrachloride, vanadyl chloride, vanadyl dichloride, vanadyl trichloride and various alkali metal and ammonium vanadate salts such as sodium vanadate, lithium vanadate, potassium vanadate, etc.

Various other oxidizing agents can also be employed to accelerate the rate of reaction. Included in such agents are the nitrogen oxides that function in a manner similar to the redox agents previously described. These nitrogen oxides can be employed as the only redox agent in the reaction medium or they can be employed jointly with the aforedescribed redox metal salts such as cupric or ferric salts. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into the reaction medium or soluble nitrate or nitrite salts such as sodium nitrate, lithium nitrate, lithium nitrite, potassium nitrate, cesium nitrate, etc., can be added to the reaction medium. In general, the use of these nitrate redox agents are preferred in anhydrous systems and the combined use of cupric salts and nitrate coredox agents is most preferred for the low temperature operations where the reaction rate would otherwise be prohibitively slow. The use of the nitrogen oxide as redox agents does not appreciably alter the yields of the major products, i.e., acetals, vinyl acetate, acetaldehyde and/or acetic acid, however, it is apparent to those skilled in the art that the nitrogen oxides should be used with caution in the alcoholic reaction medium used in acetal synthesis.

In the oxidation of olefins to unsaturated esters, the yields of ester product can be greatly increased by the addition of various carboxylate salts to the reaction medium. Generally, any soluble carboxylate salt can be added such as alkali metal carboxylates, alkaline earth carboxylates, any of the aforementioned Group VIII noble metal carboxylates or a carboxylate salt of the optional redox metals hereinafter described. The alkali metal carboxylates are preferred for their greater solubility in the organic reaction medium and of these, lithium carboxylates are most preferred. Generally, between about 0.1 and about 10 weight percent of a soluble carboxylate salt is added, preferably between about 0.5 and about 5.0 weight percent is employed. The particular alkali metal chosen has some effect on the distribution of products in the unsaturated ester production, particularly the vinyl acetate synthesis. To illustrate, the use of sodium and potassium acetates generally favor acetaldehyde and vinyl acetate production and the lithium salts favor acetic acid production. Lithium salts, however, are preferred in this oxidation because of their greater solubility and hence, the greater acetate ion concentration that can be achieved with the use of lithium.

It is of course apparent that the carboxylate salts can be formed in situ by the addition of the hydroxides of most of the aforementioned metals, particularly the alkali metal hydroxides or halides.

In general, the oxidation of olefins to unsaturated esters, e.g., ethylene to vinyl acetate, is performed at temperatures between about 30° and about 300° C.; 90° to about 180° C. are preferred, and, to obtain optimum yields of unsaturated esters, temperatures between about 120° and about 160° C. are most preferred. In general, the oxidation of ethylene to high yields of acetic acid is favored at higher temperatures and therefore, when operating so as to generate sufficient acetic acid in situ to equal that consumed in the formation of vinyl acetate, the higher temperatures are preferred in this synthesis, from about 130° to about 180° C.

The oxidation of olefins to acetals, particularly the oxidation of ethylene to 1,1-diethoxyethane is conducted at temperatures between about 30° and about 200° C.; between about 80° and about 150° C. are preferred.

The reaction pressures employed in either oxidation are sufficient to maintain liquid phase conditions and from about atmospheric to about 100 atmospheres or more, preferably elevated pressures from about 10 to about 75 atmospheres are employed and most preferably, pressures from about 40 to about 75 atmospheres are used to obtain a high reaction rate. In general, high ethylene partial pressures result in maximum rates of oxidation. Additionally, the use of high ethylene partial pressures in the synthesis of vinyl acetate results in maximum acetaldehyde and vinyl acetate synthesis.

Under the aforedescribed conditions, the olefin is rapidly oxidized to the desired compounds. In general, the liquid catalyst solution is supplied and recycled to the reaction zone at maximum rates to prevent the accumulation of substantial amounts of water that will otherwise reduce the rate of oxidation.

The following examples will illustrate the mode of practice of the invention and demonstrate the results obtainable thereby:

Example 1

A reaction system similar to that depicted in the figure was employed in these experiments. The two reactors were one-inch internal diameter and 58 inches in length. Each of the reactors was packed to a depth of 44 inches with particles of silica having an average diameter of 4 to 5 millimeters and a surface area of one square meter per gram. The level control vessel 22 of the figure was 10 inches in height and 2 inches internal diameter. The silica particles packed into the first reactor were impregnated by immersing the silica particles in an aqueous solution of palladium chloride, draining and drying the particles. The particles were then reduced by contact with hydrogen at 100° C. The catalyst contained 0.86 gram of palladium per liter of unpacked solids. The gases removed from the reactors were passed through a pressure control valve and exhausted. A sample tap was provided in the gas removal line to which a tap to a paramagnetic oxygen analyzer was connected so as to monitor the oxygen content of the exit gases. The rate of oxygen introduction to the oxidation zone was controlled to maintain the oxygen content of these gases less than about 1 percent. The gases from the product receiver, vessel 26 of the figure were laso exhausted and not recycled as shown in the figure.

The reaction medium was prepared by adding to acetic acid the following materials:

|  | Percent |
| --- | --- |
| Lithium chloride | 1.0 |
| Lithium acetate dihydrate | 1.0 |
| Cupric acetate monohydrate | 0.6 |
| Ammonium vanadate | 0.1 |

The aforementioned reaction medium was introduced into the first reactor containing the palladium chloride impregnated silica catalyst, withdrawn from the first reactor, passed to the second reactor and removed from the second reactor into the level control vessel. The liquid was withdrawn from the level control vessel at a rate to control the liquid level in the reactors and maintain the catalyst bed or inert solid bed flooded. The liquid was passed to the product receiver where it was depressured and then passed to distillation recovery steps for the recovery of the oxidized product.

The liquid reaction medium comprising the bottoms from the distillation of the product was recycled to the reaction together with sufficient quantity of fresh reaction medium to maintain a constant inventory of the reaction medium. The liquid recycle was analyzed for metals content and halogen and a sufficient quantity of halogen, i.e., hydrogen chloride, was added to the reaction medium to maintain the chloride concentration of the material constant. The reaction medium was supplied to the first reaction zone at a rate of 1 liter per hour. Ethylene was introduced into contact with the reaction medium in this reaction zone and oxygen was slowly introduced to the reaction zone while observing the oxygen analyzer so as to avoid oxygen breakthrough into the exhaust gas lines.

The oxygen introduction was initially about 175 liters per hour and the ethylene introduction was set at 240 liters per hour. The rate of oxidation gradually decreased over a 20-hour period to about a maximum of 30 liters per hour of oxygen. At this time, the flow through the system was reversed by introducing the recycle reaction medium into the second reactor and passing the crude oxidate from this second reactor into the first reactor while withdrawing the oxidized product from the latter reactor. The ethylene and oxygen introductions were switched from the first to the second reactor. The oxidation rate immediately rose to about 67 liters of oxygen per hour and this rate gradually declined until after about 38 hours of reaction time the oxidation rate was about 20 liters per hour. The flow through the reactor system was again reversed and the oxidation performed in the first reactor. The oxidation rate at this time rose to about 78 liters per hour of oxygen absorption then gradually declined to about 35 liters of oxygen per hour at 58 hours reaction time. The flow was again reversed and this sequence of reversal repeated whenever the reaction rate decreased to 40 or less liters per hour of oxygen uptake. With each reversal the initial oxidation rate rose to about 70 liters of oxygen per hour. After 80 hours the reaction was stopped.

Samples of the product were taken periodically and their purification and analysis indicated the following yields based on mol percent of ethylene converted:

| Product: | Yield, percent |
| --- | --- |
| Carbon dioxide | 15.4 |
| Butenes | 4.0 |
| Formaldehyde | 1.0 |
| Ethyl chloride | 3.3 |
| Acetaldehyde | 20.4 |
| Methyl acetate | 2.0 |
| Vinyl acetate | 37.4 |
| Butyl acetate | 0.8 |
| Ethylidene diacetate | 0.4 |

Example 2

During the preceding example it was noted that the periods of useful life between flow reversals of the catalyst was progressively decreasing. It was believed that high boiling by-products were accumulating in the recycle reaction medium and impairing the catalyst activity. Accordingly, the experiment was repeated, however during the oxidation a portion comprising 10 percent of the liquid recycle reaction medium was continuously withdrawn and replenished with acetic acid that contained hydrogen chloride in an amount required to maintain the chloride concentration of the reaction medium at its initial value.

To maintain an even temperature profile throughout the oxidation reactor, provision was made to recycle the liquid contents of the reaction zone at rates of about 5 and 10 liters per hour in successive experiments. The reaction was started and an initial reaction rate of about 60 liters per hour was observed. The oxidation was continued with periodic switching of the oxidation reaction between reactors whenever the reaction rate decreased to about 40 liters per hour. This oxidation run was continued through a total of 330 hours at which time the reaction rate was still at substantially its initial value between about 50 and 60 liters of oxygen absorption per hour. The run was discontinued at this time and the product distribution analyzed to indicate substantially the same results obtained in the preceding example.

The preceding examples are intended solely to illustrate a mode for practice of our invention and to demonstrate some of the results obtainable therewith. These examples are not intended to unduly restrict the invention which is defined by the steps and their equivalents set forth in the following method claims.

We claim:

1. The oxidation of a hydrocarbon olefin having 2 to about 20 carbon atoms to an oxygenated product selected from the class consisting of:
    (a) aldehydes;
    (b) acetals; and
    (c) carboxylic acid esters of unsaturated alcohols;
wherein the olefin is contacted, in a reaction zone, at a temperature from 30° to 300° C. and a pressure from atmospheric to about 100 atmospheres and sufficient to maintain liquid phase conditions and in the presence of a reaction medium selected from the class consisting of:
    (a) aqueous acids having a pH from 1 to about 7;
    (b) substantially anhydrous alkanols having 1 to about 20 carbons; and (c) substantially anhydrous carboxylic acids having 1 to about 8 carbons;

to prepare aldehydes when said medium is selected as said aqueous acid, to prepare acetals when said medium is selected as said alcohol and to prepare said esters when said medium is selected as said carboxylic acid; the improvement that comprises:

(1) introducing said olefin, oxygen and liquid reaction medium into mutual contact in a first reaction zone packed with a finely divided solid inert to said oxidation, insoluble in said reaction medium and having a specific surface area from 2 to 1000 square meters per gram and containing impregnated thereon between about 0.1 and 5.0 weight percent of a platinum ground metal;

(2) withdrawing a liquid phase oxidate from said first reaction zone;

(3) introducing said liquid oxidate into a second reaction zone that is also packed with inert solid;

(4) passing said liquid oxidate through said reaction zone while maintaining said second reaction zone substantially free of oxygen;

(5) withdrawing a reduced crude oxidate product from said second reaction zone; and (6) when the oxygen absorption rate in said first reaction zone decreases to a value from 10 to 75 percent of the oxygen absorption rate initially observed, periodically switching said introduction of olefin, oxygen and reaction media from said first to said second reaction zone and reversing the flow of said reaction medium through said first and second reaction zones.

2. The oxidation of claim 1 wherein said platinum group metal is palladium.

3. The oxidation of claim 1 wherein said contacting is effected in the presence of a redox agent selected from the class consisting of oxides of nitrogen and salts of multivalent metals having an oxidation potential more positive than that of said platinum group metal.

4. The oxidation of claim 1 wherein said olefin is ethylene, said organic reactant is acetic acid that contains from 0.1 to 10.0 weight percent of an alkali metal acetate and said oxygenation product is vinyl acetate.

5. The oxidation of claim 1 wherein said olefin is ethylene, said organic reactant is a alkanol having from 1 to about 5 carbon atoms and said oxygenated product is an acetal.

6. The oxidation of ethylene to vinyl acetate that comprises:

(1) introducing ethylene, oxygen and a liquid reaction medium comprising an acetic acid solution of an alkali metal acetate and cupric chloride into mutual contact at a temperature between about 30° and 300° C. and a pressure from atmospheric to 100 atmospheres, sufficient to maintain the liquid phase conditions in a first reaction zone packed with a finely divided solid inert to said oxidation, insoluble in said reaction medium and having a specific surface area of 2 to 1000 square meters per grams and containing impregnated thereon between about 0.1 and about 5.0 weight percent of palladium;

(2) withdrawing a liquid phase oxidate from said first reaction zone;

(3) introducing said liquid oxidate into a second reaction zone that is also packed with inert solid;

(4) passing said liquid oxidate through said second reaction zone while maintaining said second reaction zone substantially free of oxygen;

(5) withdrawing a reduced crude oxidate product from said second reaction zone; and (6) when the oxygen absorption rate in said first reaction zone decreases to a value from 10 to 75 percent of the oxygen absorption rate initially observed, periodically switching said introduction of said ethylene, oxygen and reaction medium from said first to said second reaction zone and reversing the flow of said reaction medium through said first and second reaction zones.

7. The oxidation of claim 6 wherein between about 0.01 and 2 weight-percent of a soluble vanadium compound is added to said liquid reaction medium to catalyze the destructive oxidation of oxalic acid which is formed as a byproduct of said oxidation.

8. The oxidation of claim 6 wherein the chloride to copper atom ratio is maintained greater than about 6.5:1 to maintain solubility of cuprous chloride in said reaction medium.

9. The oxidation of claim 6 wherein crude oxidate is distilled to recover acetaldehyde and said vinyl acetate and the acetaldehyde is recycled to said oxidation zone for oxidation to acetic acid.

References Cited

UNITED STATES PATENTS

| 3,122,586 | 2/1965 | Berndt et al. | 260—597 |
| 3,190,912 | 6/1965 | Robinson | 260—497 |
| 3,221,045 | 11/1965 | McKeon et al. | 260—497 |

OTHER REFERENCES

Parkes, Mellor's Modern Inorganic Chemistry, 1951 p. 836.

LORRAINE A. WEINBERGER, *Primary Examiner.*

V. GARNER, *Assistant Examiner.*

UNITED STATES PATENT OFFICE

CERTIFICATE OF CORRECTION

Patent No. 3,346,624  October 10, 1967

William D. Schaeffer et al.

It is hereby certified that error appears in the above numbered patent requiring correction and that the said Letters Patent should read as corrected below.

Column 11, line 15, for "ground" read -- group --.

Signed and sealed this 12th day of November 1968.

(SEAL)
Attest:

Edward M. Fletcher, Jr.
Attesting Officer

EDWARD J. BRENNER
Commissioner of Patents